United States Patent [19]
Naito et al.

[11] Patent Number: 4,637,005
[45] Date of Patent: Jan. 13, 1987

[54] FOCUS SERVO DEVICE OF A SYSTEM FOR READING OUT RECORDED INFORMATION

[75] Inventors: Ryuichi Naito; Minoru Kosaka; Katsumi Kawamura, all of Tokorozawa, Japan

[73] Assignee: Pioneer Electronic Corporation, Tokyo, Japan

[21] Appl. No.: 516,372

[22] Filed: Jul. 22, 1983

[30] Foreign Application Priority Data

Jul. 24, 1982 [JP] Japan ................... 57-129136

[51] Int. Cl.⁴ .................... G11B 7/08; G11J 1/20
[52] U.S. Cl. ....................... 369/45; 250/201
[58] Field of Search ................ 369/45, 46, 44; 250/201 DF; 318/628, 632

[56] References Cited

U.S. PATENT DOCUMENTS

| | | | |
|---|---|---|---|
| 4,286,147 | 8/1981 | Tsuboi et al. | 250/201 DF |
| 4,446,546 | 5/1984 | Miller | 369/45 |
| 4,475,182 | 10/1984 | Hosaka | 250/201 DF X |
| 4,497,047 | 1/1985 | Fujiie et al. | 369/45 |

*Primary Examiner*—Aristotelis M. Psitos
*Attorney, Agent, or Firm*—Fleit, Jacobson, Cohn & Price

[57] ABSTRACT

In a system for optically reading out information recorded on a recording medium, the focus servo device includes an object lens supported by a resilient support member and a focus servo loop. The focus loop includes a driving current generating means for generating a driving current of a cylindrical coil of a focus actuator connected to the object lens in accordance with an output signal of a pickup means which includes the object lens. The improvement is that the dc loop gain of the focus servo loop is substantially raised to infinity, so as to reduce the magnitude of the focus error signal which is required to produce the driving current of the cylindrical lens for moving the object lens against the resilient force of the support member. Further, the focus servo device is characterized by a phase retarding circuit for reducing the amount of the phase rotation at the higher frequency range so as to assure the stability of the operation of the focus servo loop.

3 Claims, 17 Drawing Figures

FOCUS SERVO DEVICE OF A SYSTEM FOR READING OUT RECORDED INFORMATION

BACKGROUND OF THE INVENTION

1. Field of the Invention

The present invention relates to a focus servo device of a system for optically reading out recorded information, and more specifically to an improvement of a focus servo device which is used to continuously adjust the position of an object lens by which a read out light beam is applied on the surface of a recording medium.

2. Description of Background Information

In a system for optically reproducing information recorded on a recording medium such as a video disc, a playback light beam is focused on a recording track formed in the surface of the recording medium, and the recorded information is reproduced by means of a pickup means for detecting the intensity of light reflected by the surface of the recording medium. In order to correctly focus the playback light beam on the recording surface, a focus servo device is generally utilized to continuously adjust the relative distance between the recording disc and an object lens by which the playback light beam is applied on the recording surface. The focus servo device generally consists of an electromagnetic actuator for moving the object lens against a resilient force of a spring member which is provided for supporting the object lens, and a drive circuit for producing a drive current for the electromagnetic actuator in accordance with a focus error signal which is produced from an output signal of the pickup means. However, in a conventional arrangement of the focus servo device, if the relative distance between the recording disc and the object lens is initially larger or smaller than a proper value due to an error in the adjustment of mechanical elements or a deviation of the thickness of the recording disc, then the operation of the focus servo device becomes inaccurate because of the necessity move the object lens against the resilient force of the spring member.

SUMMARY OF THE INVENTION

An object of the present invention is therefore to provide a focus servo device of a system for optically reading out recorded information, which is free from the error of the servo control even if the position of the recording disc is initially slightly displaced from a proper position with respect to the position of the object lens.

According to an aspect of the present invention, a focus servo device is used in a system for optically reading out information recorded on a recording medium. The device includes a movably disposed object lens for applying a read out light beam on a surface of a recording medium. The invention comprises a focus error signal generating means for generating a focus error signal from an output signal of a pickup means including the object lens, a focus actuator for adjusting a position of the object lens with respect to the surface of the recording medium, the focus actuator including a resilient support member for applying a biasing force against the object lens, and an electromagnetic actuator for moving the object lens against the biasing force of the resilient support member, a driving current generating means for generating a driving current to be applied to the electromagnetic actuator in response to the focus error signal, and defining a focus servo loop together with the focus error signal generating means, the electromagnetic actuator of the focus actuator, and an optical system including the object lens, wherein a loop gain characteristics of the focus servo loop is so determined that a loop gain of the focus servo loop increases substantially infinitely as an angular frequency of the movement of the object lens decreases below a resonant angular frequency of the focus actuator.

According to another aspect of the invention, the driving current generating means further comprises a phase retarding circuit, the gain characteristics of the phase retarding circuit being determined such that a gain of the phase retarding circuit increases substantially infinitely as an angular frequency of an input signal decreases below a turnover angular frequency which is selected slightly higher than the resonant angular frequency of the focus actuator.

According to further aspect of the invention, the phase retarding means comprises an operational amplifier whose gain increases as an angular frequency of an input signal decreases below the turnover angular frequency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects and advantages of the invention will become more clearly understood from the following description taken in conjunction with the accompanying drawings which are given by way of illustration only, and thus are not limitative of the present invention, and wherein.

DETAILED DESCRIPTION OF PREFERRED EMBODIMENTS

Figure 1:
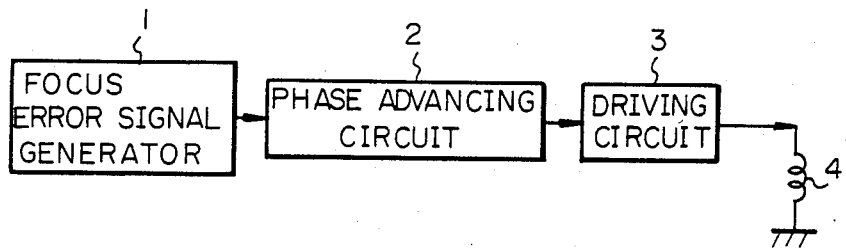
FIG. 1 is a schematic block diagram of a conventional focus servo device.

Before entering into the explanation of an embodiment of the focus servo device according to the present invention, reference is first made to FIG. 1 in which an example of a conventional focus servo device is illustrated.

As shown, the device basically consist of a focus error signal generator 1 which produces a signal responsive to the distance between an object lens and a recording surface of a recording disc. The explanation as to the construction of the focus error signal generator 1 is omitted since it is well known in the art.

The focus error signal produced by the focus error signal generator 1 is then transmitted to a phase advancing circuit 2 in which the phase and the gain of the input signal are compensated for. An output signal of the phase advancing circuit 2 is then applied to a driver circuit 3 which is connected to a cylindrical coil 4 of a focus actuator.

The construction of the focus actuator will be further explained with reference to FIG. 2. The focus actuator generally consists of the cylindrical coil 4 defining a cylindrical space therein in which an object lens 5 is mounted. The cylindrical coil 4 is placed in a magnetic field which is produced by means of a magnetic field generating means (not shown). The object lens 5 and the cylindrical coil 4 are attached to an elongated member 6 which is suspended by a spring 7 and a damper unit 8. When no electric current is supplied to the cylindrical coil 4, the object lens 5 stays at a neutral position which is determined by the weight of the lens and actuator assembly and the resilient force of the spring 7. On the other hand, when the cylindrical coil 4 is supplied with a drive current which is responsive to the level of the focus error signal, the cylindrical coil 4 as well as the object lens 5 is moved along a longitudinal axis thereof against the resilient force of the spring 7. The movement is caused by the reaction between the magnetic field and the current flowing through the cylindrical coil 4. In this way, the object lens 5 is moved along a longitudinal axis thereof.

The relation between the magnetic of the current $i_0$ flowing through the cylindrical coil 4 and the amount $x_0$ of the displacement of the lens 5 from the neutral position is expressed as follows:

$$\frac{x_0}{i_0} = \frac{Bl}{K} \cdot \frac{\omega_0^2}{S^2 + 2\zeta\omega_0 S + \omega_0^2} \quad (1)$$

in which B is a density of the magnetic field having a direction normal to the direction of the windings of the cylindrical coil 4, S is the angular frequency of the driving current $i_0$ of the cylindrical coil 4, $\omega_0$ is a resonant angular frequency of the focus actuator, $\zeta$ is a damping factor of the focus actuator, l is the total length of the cylindrical coil 4, and K is the spring constant of the spring 7. Further, $\omega_0$ and $\zeta$ are expressed as follows:

$$\omega_0 = \sqrt{K/m} \quad (2)$$

$$\zeta = d/2 \cdot \sqrt{mK} \quad (3)$$

in which m is the total weight of the movable parts, and d is the viscous damping coefficient of the damper unit 8.

Figure 2:
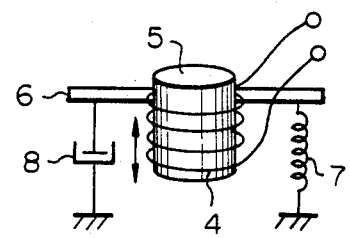
FIG. 2 is a schematical view of a focus actuator.
Figure 3A:
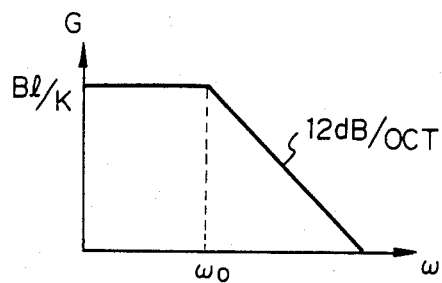
FIGS. 3A and 3B are diagrams showing gain and phase characteristics of the focus actuator.

As it will be seen from the foregoing, the focus actuator shown in FIG. 2 has a resonant angular frequency of $\omega_0$ and the denominator of the equation (1) is a function of $S^2$, the gain characteristics thereof will be such that the gain is equal to Bl/K for the lower frequency range including the dc range. Within the frequency range higher than the resonance angular frequency $\omega_0$, the gain decreases at a rate of 12 db/OCT. In addition, there is a small peak, the magnitude of which is determined by the damping factor $\zeta$ at around the resonance angular frequency $\omega_0$ (however, it is omitted in FIG. 3A).

Figure 3B:
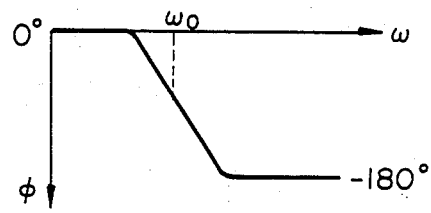

FIG. 3B shows the phase response characteristics of the focus servo actuator. As shown, the phase retardation is very small for the frequency range lower than the resonance angular frequency $\omega_0$. However, the response begins to delay at around the resonance angular frequency $\omega_0$ and the phase retardation amounts to 180° within the higher frequency range.

Figure 4:
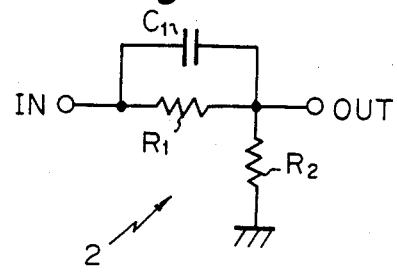
FIG. 4 is a circuit diagram showing an example of a phase advancing circuit.
Figure 5A:
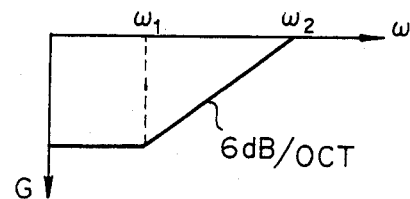
FIGS. 5A and 5B are graphs showing the gain and phase characteristics of the phase advancing circuit shown in FIG. 4.
Figure 5B:
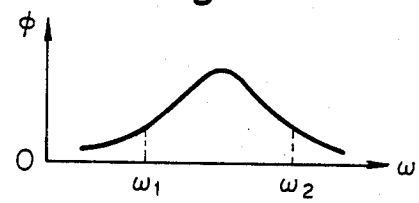

FIG. 4 shows an example of a phase advancing circuit 2 of the focus servo device shown in FIG. 1. As shown, the circuit consists of resistors $R_1$ and $R_2$ and a capacitor $C_1$. The gain and phase characteristic curves of this circuit are illustrated in FIGS. 5A and 5B. The dc gain of this circuit is equal to $R_2/(R_1+R_2)$, and within a frequency range between the frequencies $\omega_1$ and $\omega_2$, the gain increases at a rate of 6 db/OCT as shown in FIG. 5A. Within the frequency range higher than the frequency $\omega_2$, the gain is equal to 1. $\omega_1$ and $\omega_2$ are given as follows:

$$\omega_1 = 1/R_1 C_1 \quad (4)$$

$$\omega_2 = 1/(R_1 R_2/R_1 + R_2)C_1 \quad (5)$$

Further, as shown in FIG. 5B, there is no phase rotation within the dc range and within the higher frequency range and the advancement of phase occurs only within the frequency range between $\omega_1$ and $\omega_2$.

Figure 6A:
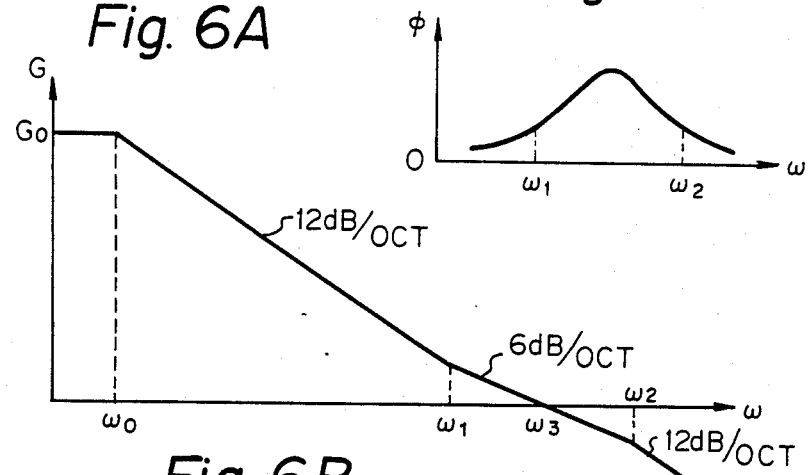
FIGS. 6A and 6B are diagrams showing loop control characteristics of the focus servo device shown in FIG. 1.
Figure 6B:
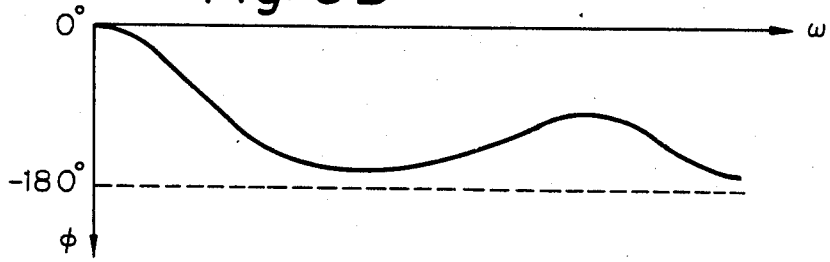

Accordingly, the total loop gain and the phase characteristics of the focus servo device of FIG. 1 will be expressed by the following FIGS. 6A and 6B. Specifically, the loop gain within the lower frequency range including dc range is equal to $G_0$ and the loop gain decreases as the frequency increases at a rate of 12 db/OCT within the frequency rage $\omega_0$ and $\omega_1$. Within the frequency range between $\omega_1$ and $\omega_2$ in which the phase advancing control is effected, the loop gain decreases at a rate of 6 db/OCT. Further, at a frequency point $\omega_3$ which is between the frequency point $\omega_1$ and $\omega_2$, the loop gain becomes equal to 1. Also, around this frequency point $\omega_3$, the magnitude of the phase retardation is reduced to less than 180° by means of the phase advancing control, and therefore there is room for a further phase shift by which the stability of the servo loop would deteriorate.

In order to obtain the characteristics shown in FIG. 6A and FIG. 6B, The gain $G_1$ of the driver circuit 3 is determined in a manner described hereinafter. If we assume that the gain of the detection of the focus error in the focus error signal generator 1 is $G_2$, and that the gain of the phase advancing circuit 2 is $G_3$ at the frequency of $\omega_3$, and the gain of the focus actuator at the frequency of $\omega_3$ is $G_4$, then the gain of the driver circuit $G_1$ is determined so that the gain of the total loop $G_1 \times G_2 \times G_3 \times G_4$ is equal to 1.

Since the conventional focus servo device is constructed in a manner described above, the loop gain within the frequency range lower than the anguar frequency $\omega_1$ will be automatically fixed if the angular frequencies $\omega_1$, $\omega_2$ and $\omega_3$ are determined. Therefore, several drawbacks are inevitable in the case of the conventional focus servo device which will be described hereinafter. If we assume that the objects lens 5 is displaced from a proper position relative to a recording surface (reflecting surface) of the recording disc, due to an adjustment error of the position of each part or the deviation of the thickness of the disc from one disc to another, then the operation of the focus servo loop of the conventional arrangement will become very inaccurate. More specifically, in this state, the object lens 5 must be moved to the proper position against the resilient force of the spring 7 in accordance with the operation of the focus servo device so that the focal point of the object lens 5 is correctly adjusted on the recording surface of the recording disc. However, in order to maintain the object lens 5 at this in-focus position which is away from the neutral position, the cylindrical coil 4 must be supplied with the driving current of a required strength so that the cylindrical coil 4 as well as the lens 5 are shifted against the resilient force of the spring 7. This means that a focus error signal (which indicates a state of out of focus) must be produced in a state where the focus servo system is actuated due to a shift of the recording surface from the neutral position. The thus produced focus error signal is then treated by the phase advancing circuit 2 and by the driver circuit 3 to produce a dc driving current of the cylindrical coil 4 for shifting the cylindrical coil 4 and the object lens 5 from the neutral position against the resilient force of the spring 7. During this type of operation of the focus servo device, it is therefore not possible to reduce the focus error which is the difference between the position of the object lens 5 driven by the focus servo system and a proper position in which the focal point of the object lens 5 lies on the recording surface of the recording medium. If the focus error in this state is large, then the level of the pickup RF signal would seriously fall down causing a deterioration of the reproduced information. Therefore, several methods have been proposed to reduce the focus error.

As an example, a method is proposed which is characterised by shifting the angular frequency $\omega_3$ (shown in FIG. 6), at which the gain of the servo loop is equal to 1, to a higher frequency, and consequently the angular frequencies $\omega_2$ and $\omega_3$ are shifted to the side of the higher frequency. With this method, the loop gain is raised throughout the whole range of the angular frequency. For this purpose, the dc gain $G_0$ must be raised, and it means the raise of the gain $G_3$ of the driver circuit 3. As the result, the dc drive current of the focus actuator is produced by a smaller amount of focus error as compared with the arrangement in which the gain $G_3$ of the driver circuit 3 is low.

However, in the case of this arrangement, the phase within the higher frequency is retarded more than 180° due to the presence of a parasitic resonance of the focus actuator. Consequently, there is no room for phase rotation at the angular frequency of $\omega_3$ and therefore, the operation of the servo loop becomes unstable. Also, there is another effect that the total gain from the focus error signal generator 1 to the cylindrical coil 4 of the focus actuator increases throughout the whole range of the angular frequency $\omega$. This means that the lens 5 is moved through unnecessarily large amplitude even in response to a focus error signal which is produced irrespectively of the focus error, such as a noise caused by a defect of the recording disc. Further, such a noise component is generally in a high frequency range. Therefore the servo loop gain of the higher frequency range should not be raised even if the servo loop gain of the dc range is increased.

As an example of another method of reducing the level of the focus error signal for compensating for the relative displacement of the recording surface of the recording medium to the focal point of the object lens, it is conceivable to modify the characteristics of the focus actuator itself. More completely, it is desirable that only the resonance angular frequency is lowered while maintaining the gain of the region in which the gain decreases at the rate of 12 db/OCT. With this provision, the dc gain of the focus actuator is raised and the intensity of the current for displacing the object lens by a predetermined distance can be reduced. The amount of the focus error for producing this current can be reduced as the result. In order to realize the lowering of the resonance angular frequency, it is necessary to decrease the spring constant K. However, if the spring constant K is decreased, the neutral position of the object lens is easily moved by an effect of gravity due to a slight inclination of the pickup device. Further, it is disadvantageous in that the parasitic resonance of high frequency will be induced by decreasing the spring constant K.

An object of the present invention, as mentioned before, is therefore to eliminate the drawbacks of the conventional arrangements which have been described above.

An embodiment of the focus servo device according to the present invention will be described hereinafter with reference to FIGS. 7 to 12.

Figure 7:
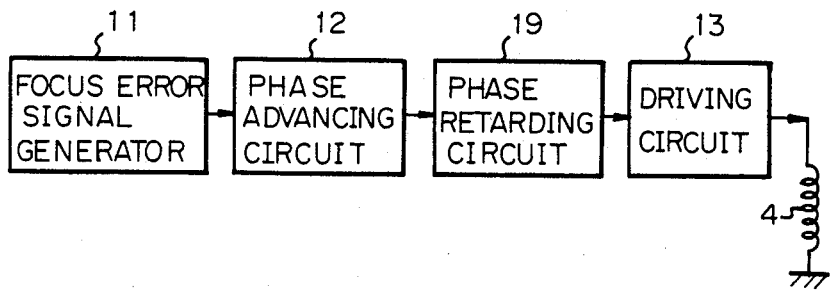
FIG. 7 is a block diagram of an embodiment of the focus servo device according to the present invention.
Figure 8:
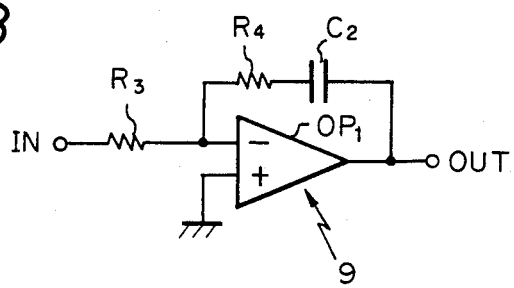
FIG. 8 is a circuit diagram of a phase retarding circuit which is used in the device shown in FIG. 7.

Reference is now made to FIG. 7, in which the block diagram of the embodiment of the focus servo device according to the present invention is illustrated. As shown, the device comprises a focus error signal generator 11 which generates a focus error signal in a manner which is well known in the art. The focus error signal from the focus error signal generator is then applied to a phase advancing circuit 12 in which the phase of the focus error signal is advanced by means of a predetermined manner. An output signal of the phase advancing circuit 12 is then applied to a phase retarding circuit 19, a circuit construction which is illustrated in FIG. 8. An output signal of the phase retarding circuit 19 is then applied to a driver circuit 13 of the focus actuator for adjusting the position of the object lens including a cylindrical coil 4. Referring to FIG. 8, the circuit construction of the phase retarding circuit 19 will be further explained. As shown, the phase retarding circuit 19 mainly consists of an operational amplifier $OP_1$ used as an inverting amplifier, the dc amplification factor thereof is theoretically equal to infinity. The operational amplifier $OP_1$ is provided with a feedback element which consists of a series circuit of a resistor $R_4$ and a capacitor $C_2$ between an inverting input terminal and an output terminal thereof. Further, an input resistor $R_3$ is connected to the inverting input terminal.

The transfer function of the phase retarding circuit 19 is expressed as follows:

$$\frac{v_{out}}{v_{in}} = -\frac{R_4}{R_3}\left(1 + \frac{1}{SC_2R_4}\right) \quad (6)$$

Figure 9A:
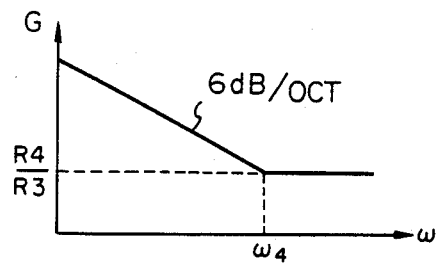
FIGS. 9A and 9B are diagrams showing the gain and the phase characteristics of the phase retarding circuit shown in FIG. 8.
Figure 9B:
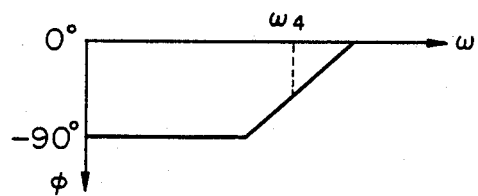

Since the phase retarding circuit 19 is basically an inverting amplifier, the phase inversion takes place therein. However, such a phase inversion is compensated for in the other circuit element of the focus error signal generating device shown in FIG. 7. Therefore, the minus sign is omitted in the equation (6). The gain and the phase characteristics of the phase retarding circuit 19 are illustrated in FIGS. 9A and 9B. As shown in FIG. 9A, the high frequency gain is equal to $R_4/R_3$ and the gain increases at a rate of 6 db/OCT as the angular frequency decreases from a turnover angular frequency $\omega_4$ which is expressed as follows.

$$\omega_4 = 1/C_2R_4 \quad (7)$$

The dc gain of the circuit is determined in accordance with the dc gain of the operational amplifier $OP_1$, and theoretically it can be increased as high as infinity. The phase characteristic is that the phase retardation is equal to 90° for the dc range and in the lower frequency range it decreases around the turnover angular frequency $\omega_4$, and becomes equal to zero at an angular frequency sufficiently above the turnover angular frequency $\omega_4$.

Figure 10A:
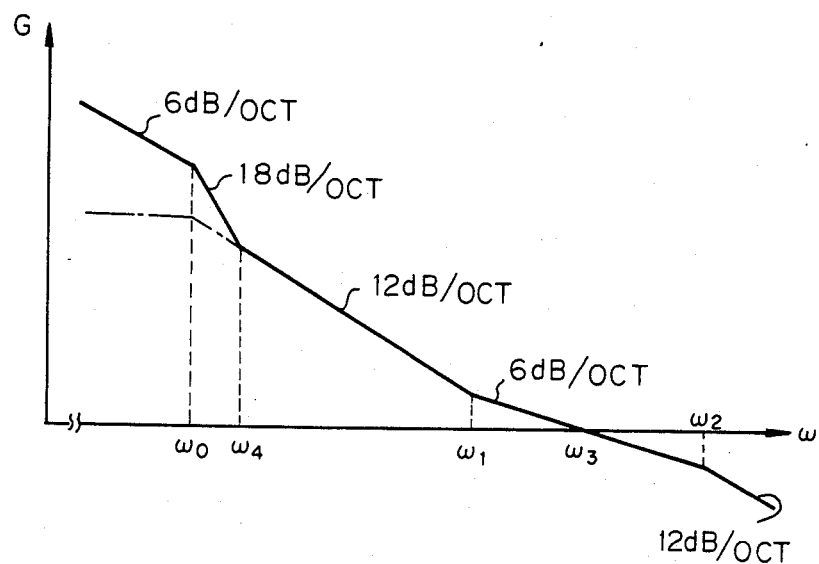
FIGS. 10A and 10B are diagrams showing loop control characteristics of a device shown in FIG. 7.
Figure 10B:
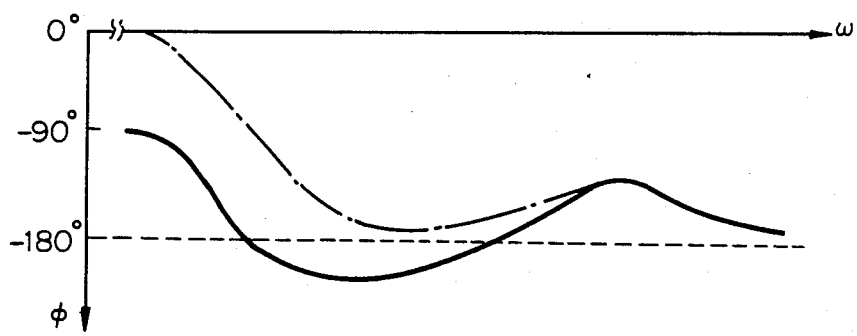

It will be appreciated that the loop control characteristics through the phase advancing circuit 12 and the phase retarding circuit 19 and the focus actuator are obtained by combining each characteristics shown in FIGS. 3A, 3B, 5A, 5B, and 9A, 9B. The thus obtained loop control characteristics are illustrated in FIGS. 10A and 10B. In addition, in the case of the loop control characteristics shown in FIGS. 10A and 10B, the resistance value of the resistors $R_3$ and $R_4$ in the circuit shown in FIG. 8 are determined to be equal to each other for the purpose of simplification, and consequently the high frequency gain of the circuit is determined to be equal to 1. Therefore, the gain characteristics for the frequency range higher than the turnover angular frequency $\omega_4$ will be substantially equal to the gain characteristics shown in FIG. 6A. In the frequency range between the frequency $\omega_0$ and $\omega_4$, the gain decreases at a rate of 18 db/OCT as the frequency increases.

In FIG. 10B, the phase characteristics of the servo loop is illustrated. As shown, the phase at the frequency of $\omega_3$ in which the loop gain is equal to 1 is sufficiently large and the operation of the servo loop is stable enough. The stability of the servo loop can be assured by using a Nyquist diagram (not shown) which can be drawn from the characteristics shown in FIGS. 10A and 10B. Furthermore, even though the frequencies $\omega_4$ and $\omega_0$ are determined to be $\omega_4 > \omega_0$ in the case of FIGS. 10A and 10B, it is obvious that the same effect can be obtained if the frequencies are determined to satisfy the following relation $\omega_4 < \omega_0$. In addition, the partly dashed lines in FIGS. 10A and 10B show the gain and the phase characteristics of the conventional arrangement.

The operation of the servo loop will be further explained by an example in which the position of the object lens with respect to the reflecting surface of the recording disc is shifted due to the deviation of the thickness of the recording surface. In this state, the object lens is moved against the resilient force of the spring 7 from the neutral point in the same manner as the conventional arrangement. Therefore, it is necessary to supply the dc current to the coil 7 for maintaining the position of the lens against the resilient force of the spring 7. However, as mentioned before, since the dc gain of the phase retarding control circuit 19 is raised substantially to infinity, it is sufficient to supply an input signal of very low level to the phase retarding circuit 19. Therefore, the level of the output signal of the focus error signal generator 1 is also sufficient to be substantially equal to zero in order to cancel the relative displacement of the object lens 5. Thus, it becomes possible to compensate for the error of the position of the object lens with respect to the position of the reflecting surface of the recording disc by means of the focus error signal which has a level substantially equal to zero.

Figure 11:
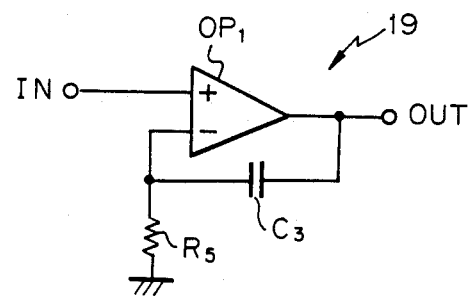
FIG. 11 is a circuit diagram of another example of the phase retarding circuit used in the device shown in FIG. 7.

Referring to FIG. 11, another example of the phase retarding circuit 19 will be explained. This phase retarding circuit 19 consists of the operational amplifier $OP_1$ and a feedback capacitor $C_3$ which is provided between an inverting input terminal and the output terminal thereof. The input signal is applied to a noninverting input terminal of the operational amplifier $OP_1$. The transfer function of this phase retarding circuit 19 is expressed by the following equation.

$$\frac{v_{out}}{v_{in}} = 1 + \frac{1}{SC_3R_5} \quad (8)$$

Therefore, this phase retarding circuit 19 has the turnover angular frequency $\omega_5$ which corresponds to the turnover angular frequency $\omega_4$ and which is expressed as follows:

$$\omega_5 = 1/C_3R_5 \quad (9)$$

The gain of the phase retarding circuit 19 for frequency range above $\omega_5$ will be equal to 1 in this arrangement.

Figure 12:
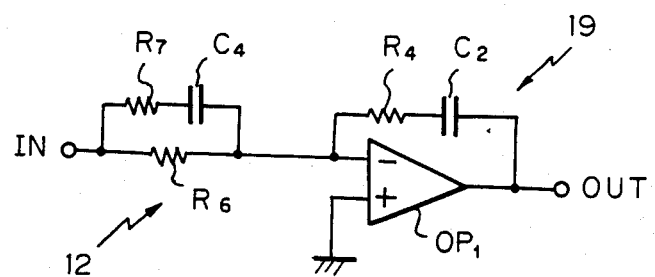
FIG. 12 is a circuit diagram showing an example of a phase advancing and retarding circuit which is to be used in the device shown in FIG. 7.

Reference is next made to FIG. 12, another example of the phase advancing control circuit 12 and the phase retarding circuit 19 will be explained. As shown, this circuit is characterized in that the phase advancing circuit 12 is connected to an input terminal of the operational amplifier $OP_1$ which is used for the phase retarding circuit 19. The phase advancing circuit consists of a parallel circuit of a resistor $R_6$ and a series circuit of a resistor $R_7$ and a capacitor $C_4$.

The transfer function of this circuit will be expressed as follows:

$$\frac{v_{out}}{v_{in}} = \left\{\frac{1 + SC_4(R_6 + R_7)}{1 + SC_4R_7}\right\}\left\{-\frac{R_4}{R_6}\left(1 + \frac{1}{SC_2R_4}\right)\right\} \quad (10)$$

It will be appreciated that the gain and the phase characteristics of this circuit are the same as the characteristics shown in FIGS. 10A and 10B.

In addition, it should be appreciated that the position of the phase retarding circuit in the servo loop is not limited to the position after the phase advancing control circuit, which was the case in the preferred embodiment, and it can be suitably determined in the servo loop in accordance with the various requirements of the circuit arrangement.

It will be understood from the foregoing that according to the present invention, it becomes possible, by using the phase retarding circuit having a dc gain as high as infinity, to eliminate the production of the focus error signal during the condition when there is a deviation of the position of the object lens with respect to the position of the reflecting surface of the recording disc due to the deviation of the thickness of the recording disc or the deviation of the reflective indicies of the reflecting surface of the recording disc. Therefore, an advantage of the invention is that very accurate adjustment of the relative distance between the object lens and the reflecting surface of the recording disc can be made.

What is claimed is:

1. A focus servo device to be used in a system for optically reading out information recorded on a recording medium comprising:
   pickup means for picking-up said information recorded on said recording medium, including a movably disposed object lens for applying a read out light beam on a surface of said recording medium;
   a focus actuator for adjusting the position of said object lens with respect to the surface of said recording medium, said focus actuator including a resilient support member for applying a biasing force against said object lens, and an electromagnetic actuator for moving said object lens against the biasing force of said resilient support member;
   focus error signal generating means for generating a focus error signal from an output signal of said pickup means;
   a driving current generating means for generating a driving current to be applied to said electromagnetic actuator in response to said focus error signal, said driving current generating means further including an operational amplifier means having a negative feedback loop that blocks a direct current;
   said driving current generator means, said focus error signal generating means, said focus actuator, and said pickup means define a focus servo loop having a loop gain characteristic in which the loop gain of said focus servo loop increases as the angular frequency of the movement of said object lens decreases below a resonant angular frequency of said focus actuator whereby cancelling a static deviation of said focus actuator in response to a negligibly small amount of said focus error signal.

2. A focus servo device as set forth in claim 1, wherein said driving current generating means further includes a phase retarding circuit, a gain characteristic of said phase retarding circuit being determined such that the gain of said phase retarding circuit increases substantially as an angular frequency of an input signal decreases below a turnover angular frequency which is selected slightly higher than said resonant angular frequency.

3. A focus servo device as set forth in claim 2, wherein said phase retarding means includes an operational amplifier whose gain increases as an angular frequency of an input signal decreases below said turnover angular frequency.

* * * * *